J. H. LEWIS.
Attaching Hubs to Axles.
No. 70,098. Patented Oct. 22, 1867.
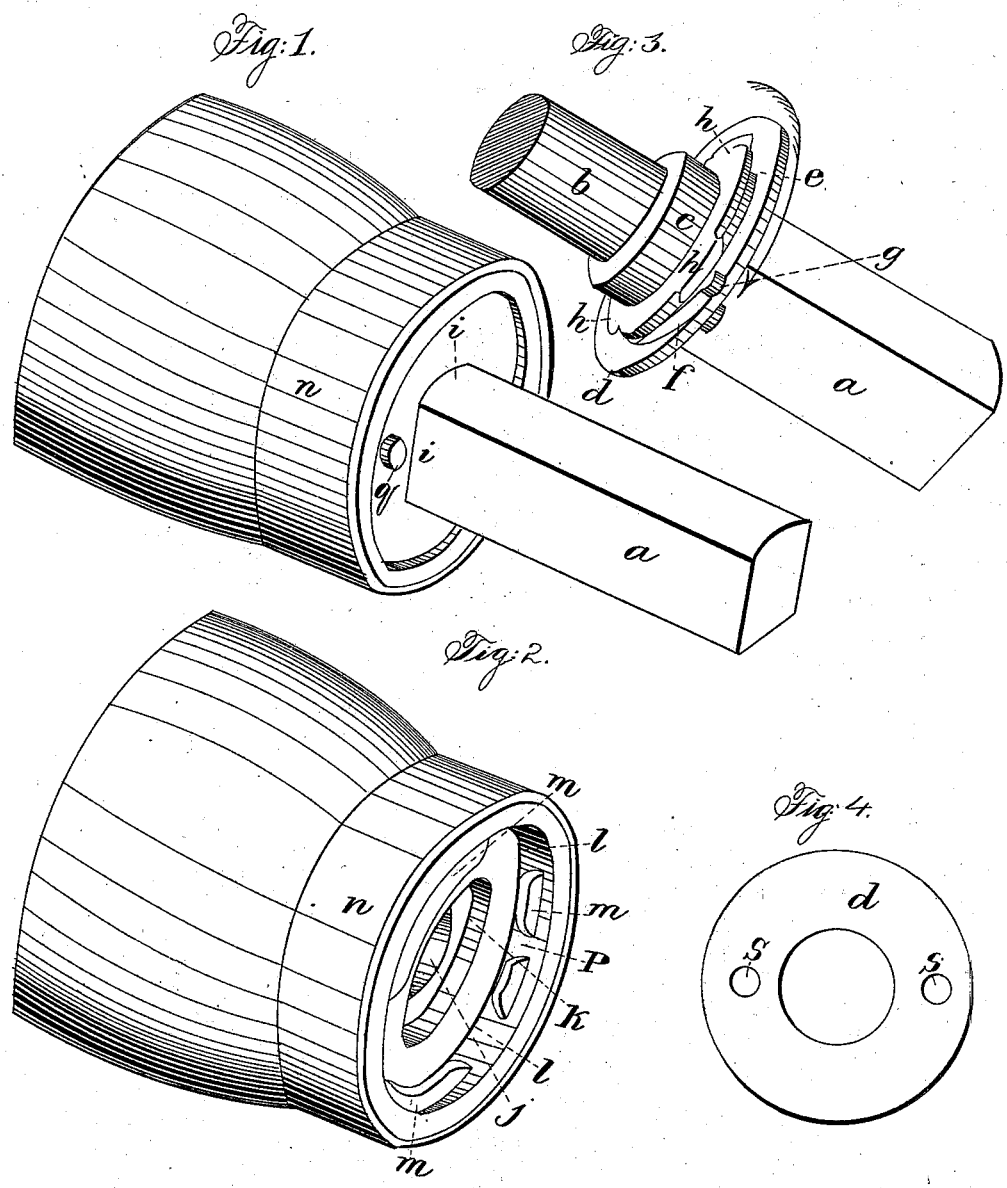
Witnesses
Irah D. Spaulding
J. N. B. Coffin Jr.
Inventor
Joseph H. Lewis

UNITED STATES PATENT OFFICE.

JOSEPH H. LEWIS, OF DUXBURY, MASSACHUSETTS.

IMPROVEMENT IN WHEELS AND AXLES FOR CARRIAGES.

Specification forming part of Letters Patent No. 70,098, dated October 22, 1867.

To all whom it may concern:

Be it known that I, JOSEPH H. LEWIS, of Duxbury, in the county of Plymouth and State of Massachusetts, have invented certain new and useful Improvements in Connections for Wheels and Axles for Carriages and other vehicles; and I do hereby declare that the following is a full and exact description thereof, reference being had to the accompanying drawings, and to the letters of reference marked thereon.

With reference to the drawings, Figure 1 is a perspective view of a part each of the axle and hub of a carriage or other vehicle. Fig. 2 is a perspective view of that part of the hub to which the connection or fastening is applied. Fig. 3 shows a perspective view of the same portion of the axle as is shown in Fig. 1, but removed from the wheel, hub, and box, so as to expose to view the axle-journal, its collar, and the connecting plate or head. Fig. 4 is an exterior view of the connecting plate or head, furnished with two holes or sockets for the application of a wrench, instead of one knob, to be used with or without a wrench, as shown in Figs. 1 and 3.

The nature of my invention relates to the construction of the central or hub portion of the wheel, and the method of securing it to the axle.

$a$ is the axle. $b$ is its journal. $c$ is a collar, fastened in any convenient manner, as by a pin through it and the axle, or by shrinking onto the plain axle or a depression therein, by screwing or otherwise. $d$ is a head or connecting plate, in the periphery of which is formed a groove, $e$, to receive the spring $f$, (furnished with the head or lug $g$,) and also two, three, or more radial wings or lugs, $h$.

The spring $f$ may be fastened with a screw, as shown, or otherwise, provided its head will move out and in, with an elastic action, toward and from the axis of the journal. The plate or head $d$, with its spring $f$ and groove $e$ and wings $h$, turns freely on the axle between the collar $c$ and a shoulder at $i$.

$j$ is the axle or journal-box in the wheel-hub. $k$ is a recess for collar $c$ to turn in, and $l$ is a metallic chamber, formed in the part joined by casting or otherwise to the journal-box $j$. In the chamber $l$ are arranged wings or lugs $m$, corresponding to the wings $h$ on plate $d$, having spaces between them sufficient to admit wings $h$, and so arranged that wings $h$ may be partially rotated or turned within or behind them, so as by them to be held in.

A notch or depression is formed in one of the lugs $m$, to furnish a resting-place or stop for the head $g$ of spring $f$.

The journal-box, and parts $k$ $l$ $m$ attached, may be secured to the hub by bolts screwed in from the opposite end of the hub, and tapped into the parts connected to the journal-box $j$, or in any other convenient manner.

A band, separate from the parts connected to the journal-box $j$, may be fitted on, as at $n$, or it may be attached to or cast together with the parts cast on or attached to the journal-box $j$, and be turned and polished, or otherwise finished or ornamented.

The operation of my improvement is as follows: The wheel-hub and journal-box $j$ being slipped onto the journal $b$, it is turned till the lugs or wings $h$ will pass between lugs $m$ and pressed on; then the plate $d$ is turned in the direction indicated by the arrow, until the head $g$ of spring $f$ springs into the depression or notch $p$ in the lug $m$, at which point of the movement the lugs $h$ are thereby locked in their position behind the lugs $m$, and the wheel is thereby fastened on.

The direction indicated by the arrow should be the backward movement of the wheel, as the arrangement of the spring is such as not to be easily thrown out of notch $p$ by the opposite movement, and this will secure the certainty of the fastening of the connection in and during the forward and ordinary movements of the wheel, while, for the occasional backward movement, the tension of the spring is sufficient, but not too much, to be easily overcome by a wrench applied to pin $q$ or holes $s$ $s$.

The materials may be such as are ordinarily used in the art, such as cast and wrought iron, brass, steel, &c.

Having described my improvement, what I claim as my invention, and desire to secure by Letters Patent, is as follows:

1. The radial flanges $h$, in combination with the plate $d$, the lugs $m$, and the wheel-hub, substantially as described.

2. The arrangement of the spring $f$, in combination with the plate $d$ and the wheel-hub, substantially as described.

3. I also claim forming the band $n$, together with and in one piece with the journal-box, substantially as described.

JOSEPH H. LEWIS.

Witnesses:
IRAH D. SPAULDING,
D. N. B. COFFIN, Jr.